Oct. 23, 1951    J. R. RANDOLPH    2,572,516
TRANSMISSION HOIST
Filed Jan. 23, 1946    2 SHEETS—SHEET 1
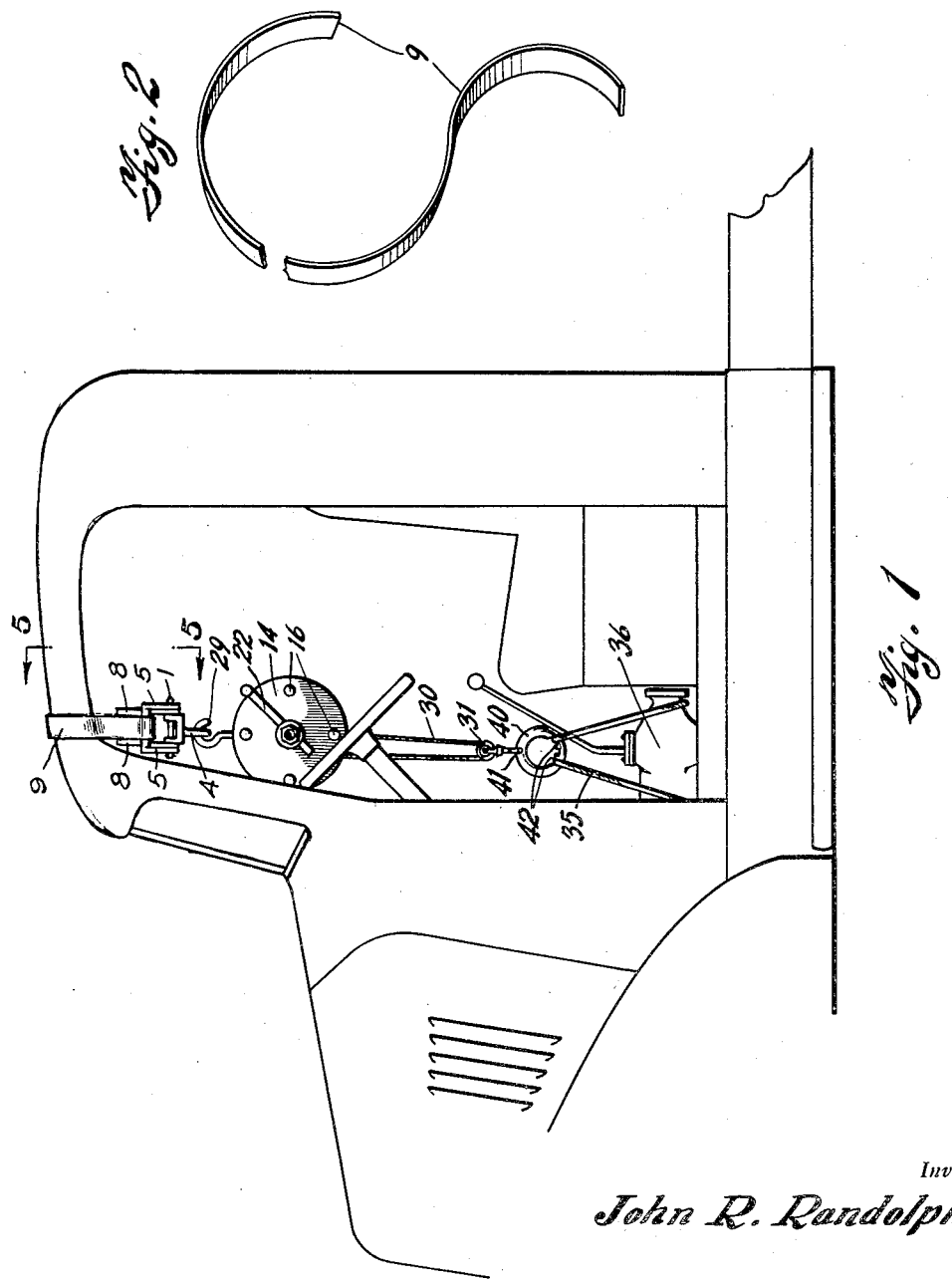
Inventor
*John R. Randolph*
By *Clarence A. O'Brien
and Harvey B. Jacobson*
Attorneys Oct. 23, 1951 — J. R. RANDOLPH — 2,572,516
TRANSMISSION HOIST
Filed Jan. 23, 1946 — 2 SHEETS—SHEET 2
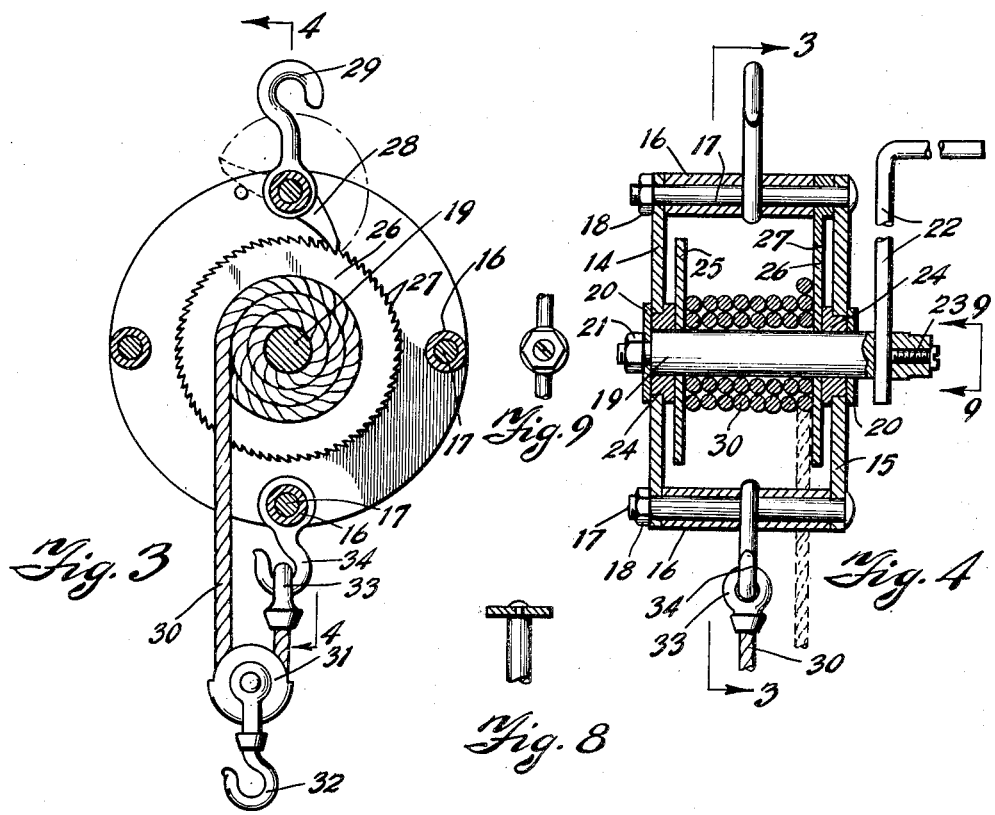
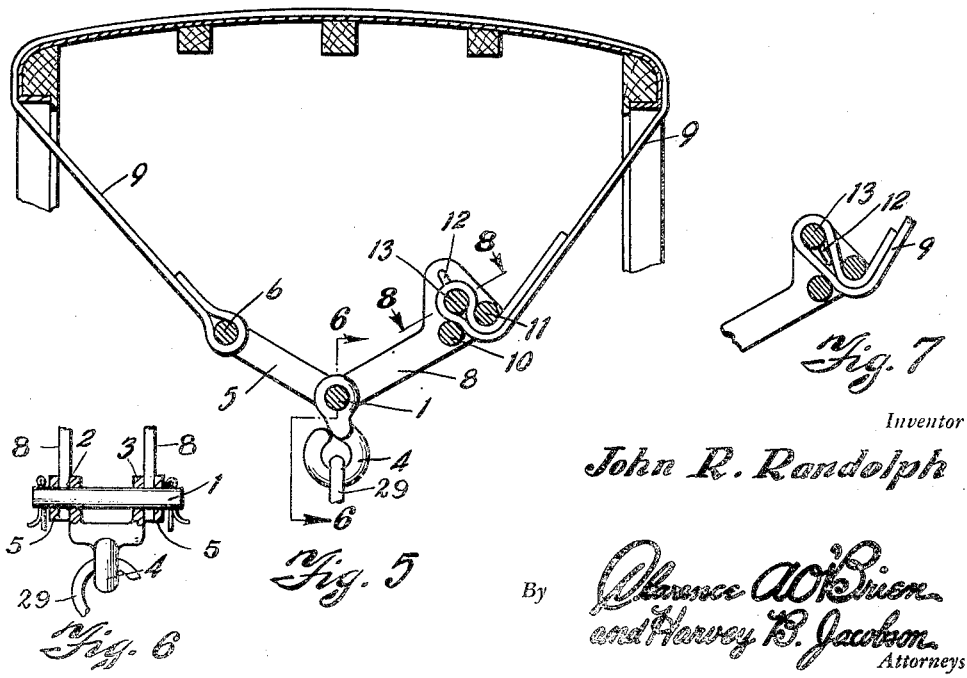
Inventor
John R. Randolph

UNITED STATES PATENT OFFICE 2,572,516

TRANSMISSION HOIST

John R. Randolph, Mexia, Tex.

Application January 23, 1946, Serial No. 642,836

3 Claims. (Cl. 254—167)

This invention relates to improvements in hoists, and more particularly to a portable manually operated hoist for lifting transmissions from motor vehicles.

An object of the invention is to provide an improved hoist which will employ means extending over the metal roof of an automobile or motor vehicle upon which the hoist will be suspended when a transmission is to be removed.

Another object of the invention is to provide an improved hoist which will be suspended on a web support overlying a metal roof of an automobile, the same being manually operated and provided with means for positively locking the hoist.

A further object of the invention is to provide an improved transmission hoist which will be highly efficient in operation, and relatively inexpensive to manufacture and produce.

Other objects will appear as the description proceeds.

In the accompanying drawings which form a part of this application,

Figure 1 is a side elevation of the cab of an automobile truck, showing the improved transmission hoist suspended from the cab roof;

Figure 2 is a perspective view of the web hoist supporting strap or belt;

Figure 3 is a sectional view taken on the line 3—3 of Figure 4;

Figure 4 is a sectional view taken on the line 4—4 of Figure 3;

Figure 5 is a sectional view taken on the line 5—5 of Figure 1;

Figure 6 is a view taken on the line 6—6 of Figure 5;

Figure 7 is a detail view partly in section of the automatic web belt tightener;

Figure 8 is a view taken on the line 8—8 of Figure 5, and

Figure 9 is a view taken on the line 9—9 of Figure 4.

Like characters of reference are used throughout the following specification and the accompanying drawings to designate corresponding parts.

In carrying out the invention, there is provided a closed eye 4 having a shank bifurcated to form upstanding arms 2 and 3, and a cross pin 1 is secured to and between said arms. A pair of links 5 each have one end pivotally secured to said cross pin, and the other ends permanently secured to one end of said belt by means of a pin 6 secured to and between said other ends and passing through a loop in said one end of the belt. A second pair of links 8 are similarly pivoted on said pin 1 and the outer ends of the second pair of links are connected by transversely spanning spaced cross pins 10 and 11 which are rigidly secured. The outer ends of the links 8 comprise parallel plates substantially triangular in shape and are formed with the opposing slots 12 closed at each end and extending therethrough at substantially right angles to a line joining the pins 10 and 11. A sliding pin 13 is mounted between said parallel plates and the pin 13 has terminals extending into the slots 12 and is movable towards and away from the pins 10 and 11.

A heavy web belt 9 of fabric or leather, or any other desired material is secured or looped about the pin 6, and when in place on a motor vehicle, the web is adapted to extend from a point near the top of the motor vehicle and directly over the vehicle transmission, and out one open doorway and over the metal roof, and back in the opposite doorway, where it passes between the spaced pins 10 and 11 and looped over the sliding pin 13 and back through said pins 10 and 11 to provide adjustability. The foregoing construction comprises the supporting means for the hoist.

The hoist proper comprises a reel construction including the spaced side members 14 and 15, the same being connected together by the four cross tubes 16, through which the bolts 17 extend, and are held in fixed position by means of the nuts 18.

An axle member 19 is disposed transversely of the reel, and extends from the sides thereof, to receive the washers 20 and a nut 21 on one threaded end of the axle 19, while a handle 22 extends through an aperture in the axle at its opposite extremity, and is secured by means of a set screw 23 extending through a hexagonal shank and into said aperture.

Bearing collars 24 are fixed in the side members 14 and 15 for the axle 19, and reel sides 25 and 26 are secured to the said axle. The reel side 26 is formed with peripheral teeth 27 which are engaged by the pawl 28 mounted on the top cross bolt 17. A hook 29 is mounted over the top cross bolt and tube and is adapted to be hooked into the eye 4 on the clevis device.

A cable 30 is secured on the reel axle 19 and is coiled thereon, and extends downwardly and around a pulley 31 having a clevis and swivel hook 32 attached thereto. The cable 30 is then led back and connected by the eye terminal 33 to a hook 34 secured to the bottom cross tube and bolt on the hoist proper. A centering ring 40 formed with an aperture 41 is adapted to be engaged by the hook 32, and the notches 42 formed in the lower inner surface of the ring are provided to receive the ends of the web belt 35 or chain which will be hooked over the transmission, whereby when the transmission has been unbolted from the engine, the reel will be operated to lift the transmission free, so that the clutch can be worked on. If the transmission has to be repaired, it will be swung outside of the motor vehicle to facilitate the repair operation. The ratchet and pawl will lock the hoist in fixed position after the transmission has been lifted clear.

The whole operation can be done by one man and will permit repairs to be made where floor space is at a premium.

While the preferred embodiment of the invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. In a transmission hoist, a hoist supporting means comprising a belt, a pair of links each having one end pivotally secured to an eye, the other end of one link being permanently secured to one end of the belt, the other end of the other link having a pair of transversely disposed spaced parallel pins fixed thereon and a third pin slidably mounted adjacent said fixed pins, the other end of said belt being looped around said sliding pin and between said fixed pins, whereby said belt is made adjustable as to effective length.

2. A device for lifting the transmission from its seat in an automotive vehicle having a cab, comprising a flexible elongated means securable on a transmission, a hoist with a centering ring connected to said means, a belt securable around the top of the cab, and means for securing the belt to said hoist, said last-mentioned means comprising a pair of links each having one end pivotally secured to an eye, the other end of one link being permanently secured to one end of the belt, the other end of the other link having a pair of transversely disposed spaced parallel pins fixed thereon and a third pin slidably mounted adjacent said fixed pins, the other end of said belt being looped around said sliding pin and between said fixed pins, whereby said belt is made adjustable as to effective length.

3. In a transmission hoist, a hoist supporting means comprising a belt, a pair of links each having one end pivotally secured to an eye, the other ends of said links being permanently secured to one end of the belt, a second pair of links each of which has one end pivotally secured to said eye, the other ends of the second pair of links having a pair of transversely disposed spaced parallel pins fixed thereon and therebetween, a third pin slidably mounted between said other ends of the second pair of links and adjacent said fixed pins, said third pin being slidable along a plane normal to the plane including the axes of the fixed pins, the other end of said belt being looped around said sliding pin and between said fixed pins, whereby said belt is made adjustable as to effective length.

JOHN R. RANDOLPH.

REFERENCES CITED

The following references are of record in the file of this patent:

UNITED STATES PATENTS

| Number | Name | Date |
|---|---|---|
| 1,283,041 | Bartholomew et al. | Oct. 29, 1918 |
| 1,445,098 | Mays | Feb. 13, 1923 |
| 2,198,414 | Panchuk | Apr. 23, 1940 |
| 2,396,790 | Jensen | Mar. 19, 1946 |
| 2,412,197 | Babson | Dec. 10, 1946 |